United States Patent
Marzocchi et al.

[11] 3,874,982
[45] Apr. 1, 1975

[54] TIRE CONSTRUCTION WITH IMPROVED REINFORCEMENT

[75] Inventors: Alfred Marzocchi, Cumberland; Alfred Winsor Brown, Woonsocket, both of R.I.

[73] Assignee: Owens-Corning Fiberglas Corporation, Toledo, Ohio

[22] Filed: Aug. 31, 1971

[21] Appl. No.: 176,463

Related U.S. Application Data

[60] Division of Ser. No. 882,770, Dec. 19, 1969, Pat. No. 3,658,108, and a continuation of Ser. No. 699,193, Jan. 19, 1968, abandoned, which is a continuation-in-part of Ser. No. 622,588, March 13, 1967, Pat. No. 3,433,689, which is a division of Ser. No. 450,790, April 26, 1965, Pat. No. 3,315,772.

[52] U.S. Cl. ............ 161/93, 161/87, 161/92, 161/98, 152/356, 152/361, 156/110 C, 156/123, 156/128 I
[51] Int. Cl. ................. B29h 9/04, B32b
[58] Field of Search ........ 156/139, 110 C, 128 R, 156/128 I, 126; 152/354, 355, 356, 357, 362, 361; 161/87, 92, 93, 98

[56] References Cited
UNITED STATES PATENTS

| | | | |
|---|---|---|---|
| 2,056,012 | 9/1936 | Madge et al. | 152/355 |
| 3,077,915 | 2/1963 | Weber | 152/355 |
| 3,095,027 | 6/1963 | Weber | 152/355 |
| 3,242,033 | 3/1966 | Dildilian et al. | 161/93 |
| 3,244,215 | 4/1966 | Bridge et al. | 152/356 |
| 3,311,152 | 3/1967 | Marzocchi et al. | 152/356 |
| 3,538,974 | 11/1970 | Marzocchi | 156/110 C |

*Primary Examiner*—Clifton B. Cosby
*Attorney, Agent, or Firm*—Carl G. Staelin; John W. Overman; Paul F. Stutz

[57] ABSTRACT

Tire construction featuring as the principal reinforcement a combination of chopped bundles or cords, each composed of an assembled plurality of glass filaments held together, and chopped discrete glass filaments distributed throughout the rubbery matrix generally uniformly, preferably at a level of about 2 to about 35 parts of glass per 100 parts of rubber and preferably with the bundles exceeding the discrete filaments in amount on a weight basis.

1 Claim, 4 Drawing Figures

TIRE CONSTRUCTION WITH IMPROVED REINFORCEMENT

This application is a division of copending application Ser. No. 882,770 filed Dec. 19, 1969, now U.S. Pat. No. 3,658,108, issued Apr. 25, 1972; which application Ser. No. 882,770 is a streamline continuation of application Ser. No. 696,193, filed Jan. 19, 1968, now abandoned; which application Ser. No. 699,193 is a continuation-in-part of application Ser. No. 622,588, filed Mar. 13, 1967, now U.S. Pat. No. 3,433,689, issued Mar. 18, 1969; which application Ser. No. 622,588 is a division of application Ser. No. 450,790, filed Apr. 26, 1965, now U.S. Pat. No. 3,315,722, issued Apr. 25, 1967; all of said recited applications being assigned to the same assignee as the present application.

A considerably large variety of natural occurring and synthetic, e.g., organic, cords, yarns and fabrics have been proposed and in fact employed as reinforcement members for pneumatic tires. Included are cotton, rayon, nylon, polyesters (a material sold under the trademark DACRON is a common example), polypropylene and ethylene propylene copolymer; the latter two more recently. Additionally, high tensile strength steel wire has been employed as a reinforcement principally, in radial type tires, as one of a plurality of belts extending circumferentially about the carcass and beneath the tread.

Glass fibers have also previously been suggested as a candidate reinforcement. See, for example, U.S. Pat. No. 2,184,326. U.S. Pat. No. 3,311,152, also assigned to Owens-Corning Fiberglas Corporation, discloses the utilization of cord structures of particular composition and, additionally, the employment of reinforcing belt members composed of cords of glass.

The previously mentioned natural occurring and organic synthetic materials unfortunately are possessed of a number of shortcomings.

Cotton experiences degradation when exposed to moisture and suffers severe elongation. Rayon is low in modulus and its low strength per unit of cross-sectional area is quite well known. The polyamides, e.g., nylon, for example, are stronger than rayon but they are subject to considerable elongation and yield under load. The thermal character of nylon also makes the tire in which it appears as the reinforcement subject to "thumping" due to flat spots which form in the tire during cool weather or even a cool evening. Thus, the nylon cords which are deformed in that region of the tire in contact with the road take a "thermal set" corresponding in configuration to the deflection of the tire. Then, of course, when the tire rotates on the ground, the flat spot in the carcass yields a repeated "thump." This continues until the tire heats up due to the heat developed during ensuing rotation under load. A problem also exists in the employment of organics by reason of the uncontrollable and irregular elongation and yield. Thus, tires produced by different manufacturers have different overall dimensions and different carcass strengths, although they are purportedly the same size tire as generally characterized by diameter and tread width.

Glass, on the other hand, considered academically, possesses a number of very desirable properties. The properties of a single glass filament include (a) essentially 100 percent elasticity, (b) essentially no yield under stress, (c) excellent dimensional stability and (d) immunity to change in properties by reason of varying atmospheric conditions. The translation or the utilization of these properties as a tire reinforcement, however, requires the consideration of other properties of glass which are considerably different from the conventional organics. These properties include (1) stiffness (glass is 322 grams per denier [gpd] while nylon ranges from 18 to 23 gpd, the polyesters range from 11 to 21 gpd, the acrylics such as Acrilan and Orlon 7 to 10 gpd and viscose rayon 11 to 25 gpd); (2) a low breaking elongation (glass is 3–4 percent whereas the polyesters range from 19–30 percent, nylon 16–40 percent, acrylics, e.g., Acrilan, 36–40 percent and viscose rayon 9–30 percent); (3) a relatively high specific gravity (glass is 2.54 compared to 1.14 for nylon and the acrylics, 1.5 for rayon and 1.22 to 1.38 for the polyesters, e.g., KODEL and DACRON); and (4) toughness (on a denier basis, glass has a value of 0.07 compared to nylon's 0.75, rayon's 0.20, 0.5 for DACRON polyester, 0.37 for KODEL polyester and 0.4 for the acrylic ORLON).

From the above, it can be appreciated that the utilization of glass in any form, e.g., filament, strand or cord, as a reinforcement for rubber is not a matter of substitution but, to the contrary, entails a consideration of the overall properties and, as well, a determination of the ideal geometric location of the glass, alone and in combination with other materials, in order to achieve effective reinforcement.

It is an object of the present invention to provide a pneumatic tire including novel and improved reinforcement systems which provides features of advantage in manufacturing as well as service capabilities as compared to conventional tires known heretofore.

It is still another object of the present invention to provide a tire construction which, while representing a considerable departure from conventional reinforcement, is adapted for manufacture in conventional tire manufacturing facilities.

It is a particular object of the present invention to provide a tire construction featuring a reinforcement which allows elimination of the conventional carcass plies composed of continuous mutually parallel cords of one material or another.

It is still another particular object of the present invention to provide a tire construction featuring an elastomeric matrix which is possessed of static as well as dynamic properties which are larger than conventionally reinforced rubber stocks.

It is a particular object of the present invention to provide a tire which is possessed of improved traction under icy, snowy and wet conditions.

It is likewise another object of the present invention to provide a tire construction which is relatively inexpensive, albeit the advantages enumerated hereinabove.

It is yet another object of the present invention to provide a tire construction featuring an elastomeric stock which is possessed of improved elasticity based upon modulus by reason of the novel reinforcing system contemplated herein.

It is still another object of the present invention to provide a tire construction which, by reason of the unique reinforcement system, is more dimensionally stable and more accurately reflective of the dimensions of the mold cavity in which vulcanization takes place.

It is also an object of the present invention to provide a reinforcement system for pneumatic tires which, in conjunction with conventional bias cord reinforcement, permits the attainment of the optimum reinforcement by the cords by reason of an achievement of a transfer of stresses from the cords in one ply to the cords in an adjacent ply.

It is also an object of the present invention to provide a tire construction featuring as the principal elastomeric stock reinforcement an amount of glass in chopped form; some of it being in the form of chopped discrete fibers and some, usually the greater amount, in the form of chopped cords.

It is a particular object of the present invention to provide tires which feature randomly distributed short lengths of glass fibers and short lengths of glass bundles in the tread region to lend resistance to chunking as well as resistance to cut through from foreign objects in the tire path.

It is also an object of the present invention to provide a unique method of producing a tire featuring constructional features in accordance with the present invention.

The foregoing, as well as other objects of the present invention, will become apparent to those skilled in the art from the following detailed description taken in conjunction with the annexed sheets of drawings on which there are presented, for purposes of illustration only, several embodiments of the present invention.

In accordance with one embodiment of the present invention, a tire construction embodies, as essentially the sole reinforcement (other than carbon black and the like), a chopped glass reinforcement; a proportion of which is in the form of bundles composed of an assembled plurality of individual filaments held in bundle configuration by an elastomeric impregnant and a proportion composed of a plurality of discrete individual filaments of glass of extremely short length.

In accordance with another embodiment of the present invention, the rubber composition or elastomeric composition containing the combination of bundles and filaments is incorporated into a tire construction in particular regions. For example, when present in the tread region, the elastomeric composition containing both bundles and fibers imparts to the tire the capabilities of improved traction and, as well, wear and endurance.

In a further embodiment of the present invention, a tire construction, composed of a bias ply carcass featuring mutually parallel cords and one or more belt plies situated between the carcass plies and the tread and coextensively therewith, contains, in addition, in adjacent proximity to the bias plies and the belt plies, a layer which contains a combination of the chopped glass, a proportion of which consists of bundles of assembled filaments and a proportion of which consists of discrete individual filaments, all distributed relatively uniformly throughout the layer concerned.

Figures 1, 1A:
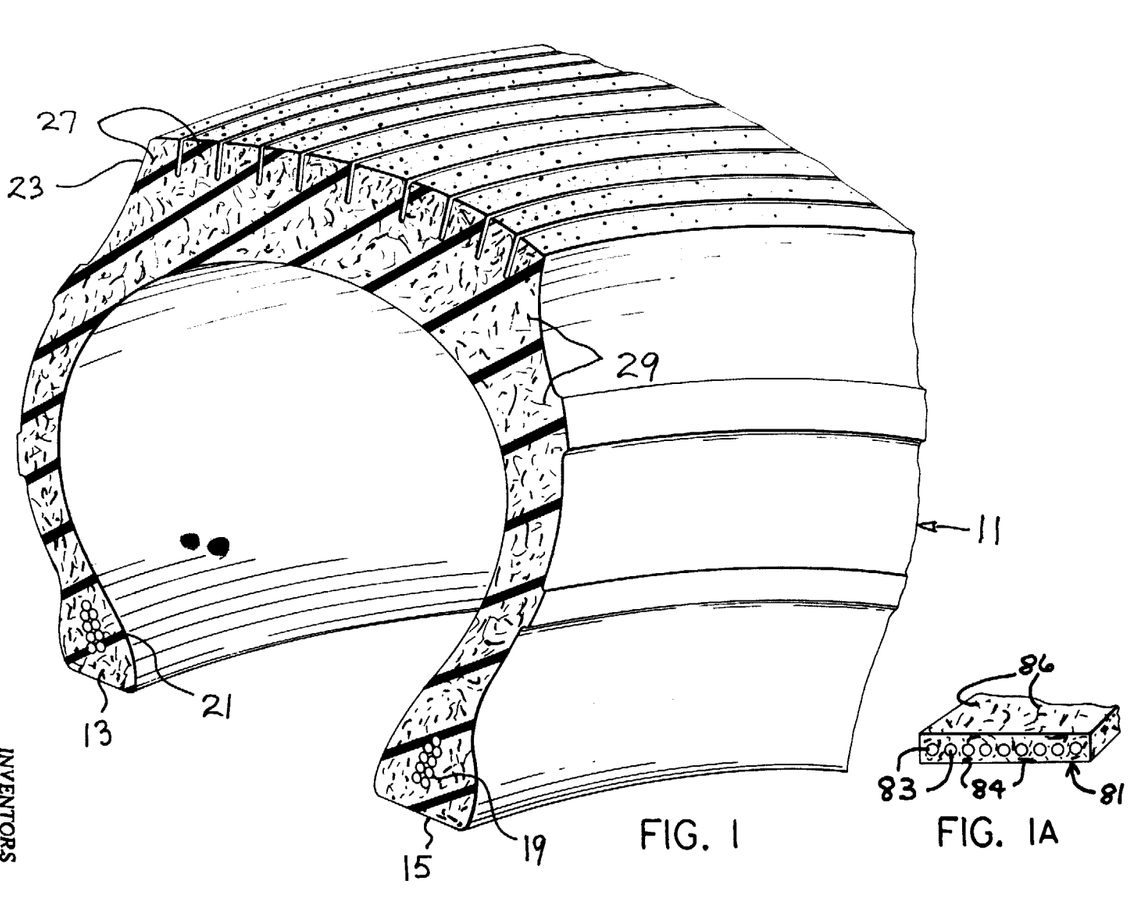
FIG. 1 is a three-quarter perspective view of a cross-sectional segment of a tire featuring a reinforcement system in accordance with the present invention.
FIG. 1A a perspective view of a segment of rubber sheet good illustrating another embodiment of the present invention.

Referring now more specifically to the drawings, there is disclosed in FIG. 1 a tire 11 composed of spaced beads 13 and 15 connected by a toroidally extending carcass 17. The beads contan interiorly thereof reinforcing rings 19 and 21. At the crown region of the toroidal carcass, there is integrally secured thereto a tread 23 which is the ground engaging part of the tire; the beads engaging the rim portion of the wheel. In accordance with the present invention, the elastomeric stock contains distributed therethrough a plurality of chopped bundles 27 situated randomly therethrough and, in addition, a plurality of discrete filaments 29. The bundles and the filaments are both formed of a mineral substance, preferably glass. In the embodiment of FIG. 1, the tire contains no conventional carcass reinforcement as, for example, radial or bias ply cords. By reason of the random uniform distribution of the discrete fibers and the short chopped bundles throughout the elastomeric matrix, the ground engaging surface of the tread contains a plurality of discontinuities representing the individual filaments and the bundles or cords. These discontinuities provide improved traction under wet, icy or snowy conditions. It should be appreciated that in accordance with the present invention these discrete fibers and chopped bundles or cords remain integrally secured to the surrounding elastomer.

Referring to FIG. 1A, there is disclosed a particular embodiment of the present invention in the form of a strip or sheet 81 composed of an elastomeric material including principal reinforcement in the form of mutually parallel cords 83 formed of synthetic material such as rayon or polyamide, e.g., nylon. Additionally, the elastomeric stock material contains chopped bundles 84 and short discrete individual filaments of glass 86 as described generally hereinbefore and in more detail hereinafter.

Figure 2:
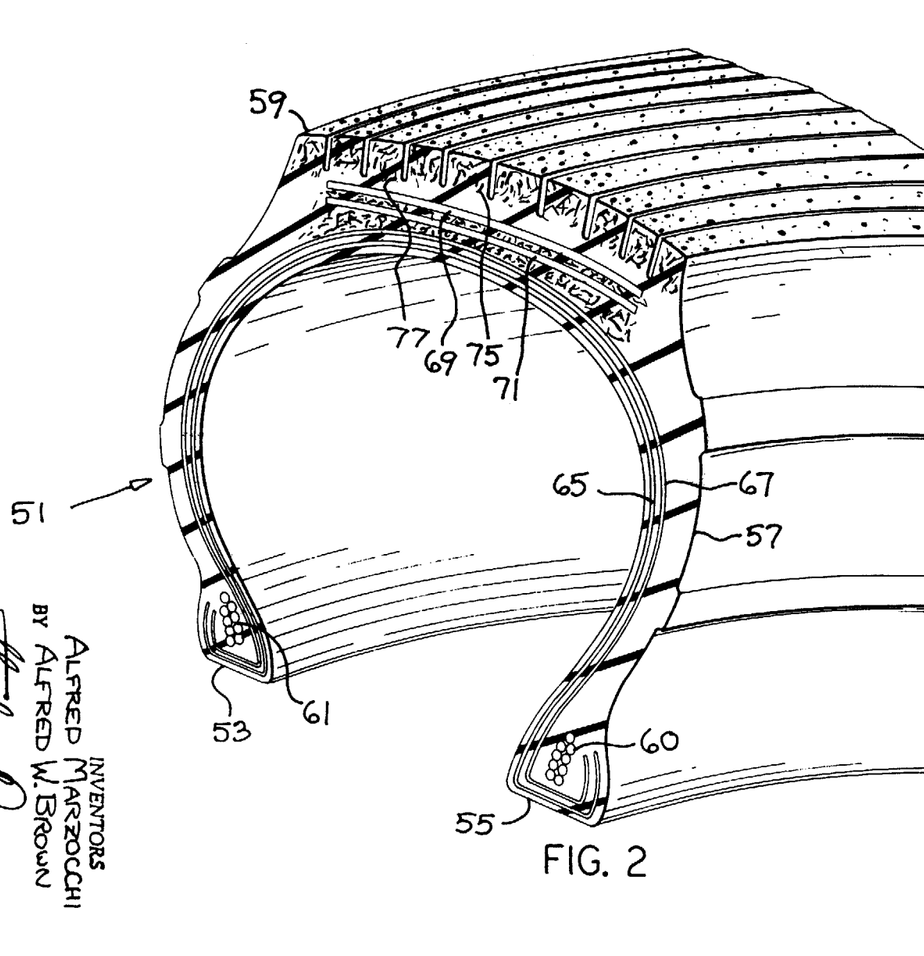
FIG. 2 is a similar view of a segment of a tire representing an alternative embodiment of the present invention.

In FIG. 2, there is illustrated a tire 51 composed of spaced beads 53 and 55 connected by the toroidal carcass 57 bearing integrally at the crown region a tread 59. Bead ring members 60 and 61 are situated interiorly of the beads 55 and 53, respectively. The tire includes carcass plies 65 and 67. The carcass plies extend from bead to bead as shown and are wrapped about each bead in a conventional turnup. Additional reinforcement is provided by peripheral belt plies 69 and 71 located also in the crown region above and radially outwardly from the carcass plies but beneath the tread and generally laterally coextensive therewith.

Figure 3:
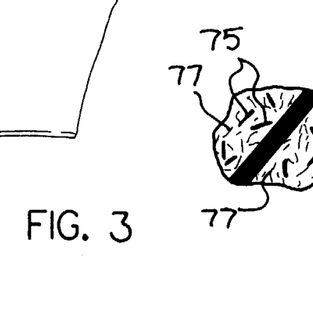
FIG. 3 is a greatly enlarged view of a segment of the cross-sectional face of the tire of FIG. 2.

The tread is composed of elastomeric material having distributed therethrough a proportion of chopped bundles 75, each composed of a plurality of filaments secured together, and a proportion of discrete fibers 77. The elastomeric stock between the belt plies 71 and 69 and between the belt ply 71 and the outer carcass ply 67 is similarly composed. The nature of the discrete fibers and the chopped bundles is more clearly illustrated in the enlarged view of FIG. 3.

The tread stock thusly composed provides significantly improved tractive properties under snowy and icy conditions. This improvement is due to the combined effect of the particular modulus of the stock and the presence of discontinuities in the tread surface in the form of bundle ends and fiber ends. Both the bundle and fiber are securely held by the matrix proper in which the bundle or fiber is embedded. This securement is provided by means of appropriate impregnant coatings as will be described hereinafter.

The presence of the stock, containing both chopped bundles and short discrete filaments of glass, in the region between the outer tread reinforcing belts and the conventional carcass plies serves to unitize, as it were, the belt plies and the carcass plies. It is not uncommon to normally consider the belt plies and the carcass plies as separate independent members from the operational point of view. In previous tires, the belt plies are separated from the carcass plies by a region of the same rubber of which the remainder of the tire is composed. In accordance with the embodiment, however, the stresses to which the belt plies are subjected are partially borne by the cords of which the carcass plies are composed.

The elastomeric stock material, of which the tire illustrated in FIG. 1 is composed and of which the tread stock and the stock surrounding the reinforcement plies of the embodiment of FIG. 2 is composed, may be prepared in a variety of ways. Thus, the glass may be combined with the rubber via Banbury mixing or preferably via mill mixing. The discrete fibers and the bundles composed of the assembled plurality of fibers may be added to the rubber stock and processed to sheet, strip or to other forms. The stock recipe should be well mixed on the mill before the addition of glass or, in the Banbury, the stock should be mixed first and the glass added as a later addition in order to avoid breakdown of the glass; that is, in order that the glass substantially retain its definition or identity as a bundle and/or fiber of given length. Too severe a mixing within the Banbury or the mill will tend to cause the glass bundles and fibers to deteriorate to essentially particle size, which phenomena is to be avoided.

Most preferably, the glass is added to the mixed stock in two separate and distinct stages and in the form of bundles, each composed of a plurality of from about 500 to about 30,000 filaments. Thus, in a mill mix, a first amount (the preferred amounts will be discussed more fully hereinafter) of bundles is added to the stock on the mill, preceded, of course, by a mill mixing of the particular recipe. The first amount of chopped bundles introduced on the mill will, after a number of passes, be found to become largely separated into individual discrete filaments which become uniformly distributed throughout the stock on the mill with some observable linear orientation in the direction of the moving stock. Subsequently and preferably just prior to the cessation of mixing, a second amount of chopped bundles or cords of glass is added to the stock. The mixing is allowed to proceed just sufficiently to distribute the chopped bundles throughout the mass with little or no separation into discrete filaments. The mass of the glass, inherent in the bundle form, coupled with the relatively high specific gravity leads to a rather rapid distribution of the bundles throughout the stock. Thus, usually from three to seven passes on the conventional rubber mill will suffice to distribute the chopped cords relatively uniformly without appreciable separation of the bundles or cords.

By way of further explanation, it will be appreciated that filaments of glass are drawn in a molten state from a heated multi-orifice platinum bushing and gathered together into strand configuration contemporaneous with the spraying thereon of a size composition preferably containing an anchoring agent adapted to impart to the glass surface the ability to adhere to the ultimate rubber stock. Generally, 204 filaments are gathered together to form a strand, although a strand may be composed of 400, up to 900 and occasionally 2,000 filaments; in each case, drawn from a single bushing. The strands become cooled and solidified in the attenuation thereof at high rates of speed from the bushing and are wound after sizing onto a spool. The continuous strand wound about a spool can then be plied and combined with additional like strands to form multiple strand yarns. Additionally, the multiple strands and yarns can be plied and combined with like yarns with or without twist to form the cords or bundles as referred to earlier herein. As indicated, the glass filaments are preferably coated with a suitable size, for example, an amino silane; a variety of formulations for which are dislosed in application Ser. No. 406,501, filed Oct. 26, 1964, entitled "Glass Fibers Treated For Combination With Elastomeric Materials and Method" and being assigned to the assignee of the present application. One typical size composition is composed of 0.5–2.0 percent by weight of gamma-aminopropyltriethoxy silane, 0.3–0.6 percent by weight of a lubricant, such as glycerine, and the remainder composed of water. The strands of yarns composed of assembled continuous glass filaments of which the cords are composed are impregnated with an elastomeric impregnant to assist in the attachment thereof to the surrounding rubber matrix in the tire construction. The strands, yarns or cords are impregnated by immersion in a suitable impregnant bath, for example, 60–40 parts by weight of a 38 percent dispersed solids system including a butadiene-styrene-vinyl pyridine terpolymer latex, a butadiene styrene latex and a resorcinol-formaldehyde resin; said solids being dispersed in 40 parts by weight of water. A suitable commercial product is LOTOL 5440, a product marketed under that trade name by Uniroyal (formerly U.S. Rubber Co.).

EXAMPLE I

Four different neoprene stocks were prepared to determine the properties imparted by the inclusion therein of relatively short discrete glass filaments and short lengths of chopped cords or bundles; each comosed of a plurality of assembled filaments. The glass cord was composed of filaments measuring 0.00036 inches in diameter. Three 204-filament strands were combined together; the filaments bearing a size as described above and the strands being impregnated as described just previously. The ultimate assembled impregnated cord was cut into ¼ inch lengths and added to the neoprene stocks in the manner described hereinbelow.

A. The control neoprene stock has the formulation given in Table 1 below.

TABLE 1

| | |
|---|---|
| Neoprene GRT | 100 |
| Stearic Acid | 2 |
| Maglite D | 4 |
| Polyethylene AC | 4 |
| Neozone D | 2 |
| SRF Black | 60 |
| Zinc Oxide | 5 |
| Paraflux | 10 |
| Altax | 1.5 |
| | 188.5 |

Test specimens were prepared and retained for testing.

B. A stock as in (A) was mill mixed and to it was added an amount of ¼ inch lengths of the chopped cord providing a level of 17 percent by weight. The stock was allowed to mix sufficiently that substantially all chopped bundles separated into individual filaments such that there were essentially no cords or bundles in the stock. The stock was removed and test specimens prepared and vulcanized at 300°F. for from 20 to 60 minutes, depending on size of the specimens.

C. A proportion of the same stock was mixed on the mill and 17 percent by weight of ¼ inch chopped bundles as above were added, but the mixing was continued just sufficiently to disperse the bundles so that all of the glass contained in the neoprene stock was in the form of bundles and there were essentially no individual or discrete filaments present. Again, test specimens were prepared from the thusly prepared stock.

D. Another proportion of the same neoprene stock was mixed and 17 percent by weight of glass was added in this manner: 5 percent of the total chopped ¼ inch cords were added and thoroughly blended into the elastomer so that these cords became separated into individual filaments; 95 percent of the total glass cords or bundles were added and mixing continued just sufficiently to disperse the bundles so that the final stock contained a minor proportion (5 percent) of individual filaments and 95 percent of unseparated ¼ inch cords or bundles. Again, test specimens were prepared.

The test specimens from the above stock formulations were tested in accordance with conventional rubber testing practice with the observed properties of each, that is, the tensile, the elongation, modulus, tear, hardness and resilience, being summarized in Table 2 in which the vertical columns are labeled corresponding to the previous paragraphs, e.g., A, B, C and D.

TABLE 2

|  | A | B | C | D |
|---|---|---|---|---|
| Tensile (psi) | 2385 | 2025 | 2385 | 2675 |
| Elongation (%) | 395 | 315 | 28 | 25 |
| Modulus at 300% (psi) | 1920 | 1975 | — | — |
| Tear (Die C) (pounds) | 266 | 243 | 357 | 420 |
| Hardness (Shore A) | 71 | 82 | 90 | 93 |
| Resilience (Bashore) | 24 | 23 | 22 | 22 |

As revealed in the above table, the tensile strength and the tear strength are highest in the stock formulation containing both the chopped bundles and the short discrete filaments. Compositon B containing 17 percent of glass, all of which is in the form of extremely short lengths by reason of the longer mixing, shows a general overall degradation in properties. Composition C in which the glass reinforcement is entirely in the form of cords shows an improvement in that the tensile and tear strengths are improved over Composition B. As indicated, the best overall tensile and tear strengths are present in Composition D.

EXAMPLE II

Various amounts of chopped glass bundles were added to a mill mixed tire tread compound to determine the effect. The compound was a 75/25 blend of butadiene styrene rubber and a cis-1,4 polybutadiene rubber. The recipe appears in Table 3.

TABLE 3

|  | A | B | C | D |
|---|---|---|---|---|
| SBR 1712 | 103 | 103 | 103 | 103 |
| Ameripol CB 441 | 34.4 | 34.4 | 34.4 | 34.4 |
| ISAF Black | 75 | 75 | 75 | 75 |
| Sundex 790 | 12.6 | 12.6 | 12.6 | 12.6 |
| Zinc Oxide | 3 | 3 | 3 | 3 |
| Stearic Acid | 2 | 2 | 2 | 2 |
| Wingstay 100 | 2 | 2 | 2 | 2 |
| Sunproof Improved Wax | 2.5 | 2.5 | 2.5 | 2.5 |
| Santocure | 1 | 1 | 1 | 1 |
| Monex | 0.2 | 0.2 | 0.2 | 0.2 |
| Sulfur | 1.75 | 1.75 | 1.75 | 1.75 |
| Chopped Glass Bundles | — | 5 | 10 | 20 |

The glass bundles were composed of three 204-filament strands assembled together. The individual filaments had a diameter of 0.00036 inches. The filaments were sized as previously described and the three-strand bundle was impregnated. The bundles were chopped into ¼ inch lengths and added to the tire tread stock in varying amounts listed in Table 3. The glass was added sequentially; that is, with a minor amount ranging from 5–10 percent of the total added first to the stock so that it would defilamentize into discrete individual fibers. The majority (90–95 percent) was added as bundles late in the mixing cycle so that it retained its bundle integrity. The level of glass reinforcement as seen in Table 3 and Table 4 below was 0, 5, 10 or 20 percent. The percent glass reinforcement was calculated as the amount of glass divided by the amount of glass plus the amount of stock times 100. The variation in properties according to glass content is given in Table 4.

TABLE 4

|  | % Glass | | | |
|---|---|---|---|---|
|  | 0 | 5 | 10 | 20 |
| Tensile | 3045 | 2175 | 2135 | 1785 |
| Elongation | 700 | 625 | 535 | 440 |
| Modulus: | | | | |
| 100% | 195 | 305 | 425 | 595 |
| 200% | 440 | 480 | 615 | 770 |
| 300% | 870 | 785 | 985 | 1040 |
| Shore A | 65 | 67 | 70 | 74 |
| Tear | 235 | 240 | 260 | 265 |

EXAMPLE III

Passenger vehicle tires (8.25 × 14) were built employing in the tread stock an amount of chopped bundles and an amount of discrete individual filaments. The tires were evaluated under snow and ice conditions in comparison with a standard tread stock; that is, not containing the glass filament reinforcement. Also evaluated were tires featuring the chopped bundles and chopped fibers containing tread stock and also glass cord reinforcing belts. The formulation for the glass-containing tread stock and the control stock are contained in Table 5.

TABLE 5

|  | 100 RHC | 100 RHC |
|---|---|---|
| SBR 1608 (a butadiene styrene, a product of United Carbon) Ameripol CB 441 | 123.25 | 123.25 |
| (cis-1,4 polybutadiene polymer marketed by Goodrich Gulf) | 34.40 | 34.40 |
| Vulcan 6 (ISAF Black) | 36 | 36 |
| High Aromatic Oil (Sundex 790) | 30 | 30 |
| Zinc Oxide | 3 | 3 |
| Stearic Acid | 2 | 2 |
| Wingstay 100 | 2 | 2 |
| Sunproof Improved Wax | 2.5 | 2.5 |
| TMTM (Monex) | 0.2 | 0.2 |
| NCBS (Santocure) | 1.0 | 1.0 |
| Sulfur | 1.75 | 1.75 |
| Glass* | 12 | — |
|  | 248.10 | 236.10 |

*90% ¼ inch chopped impregnated bundles, each composed of three 204-filament strands plied together; 10% discrete ¼ inch filaments.

The physical properties of the glass containing compound are listed in Table 6 below together with properties of the control compound.

TABLE 6

| Properties | Glass Containing Tread Compound | Control Stock |
|---|---|---|
| Tensile | 1600 | 2380 |
| Elongation | 440 | 550 |
| Modulus at 300% | 1135 | 1095 |
| Tear (Die C) | 230 | 247 |
| Hardness (Shore A) | 66 | 61 |
| Specific Gravity | 1.16 | 1.14 | a. A pair of control tires were formed utilizing the nonglass filled tread compound of Table 5. The tread matrix employed a snow tread design known as a "snow cap." A pair of essentially identical tires were formed, but using the tread compound of Table 5 containing bundles chopped to ¼ inch length and individual filaments chopped to ¼ inch length; the tread also employing the snow cap tread configuration. A third pair of tires were fabricated identical to the second pair except that, in addition, the tire featured a pair of belt plies beneath the tread and above the carcass. These belts were formed of mutually parallel cords of glass as described in Example X of U.S. Pat. No. 3,311,152. The tires were mounted on test vehicles and run over packed snow, wet ice and dry ice courses. The vehicles were equipped with instruments enabling a measuring evaluation of tractive performance of the tires. The results are tabulated in Table 7 below.

TABLE 7

| Code* | At Max. Drawbar Lbs. | Dynamic Traction Rating | | | | | | | |
|---|---|---|---|---|---|---|---|---|---|
| | | Lbs. at 40% Wheel Slip | | Lbs. at 100% Wheel Slip | | Lbs. at 200% Wheel Slip | | Lbs. at 400% Wheel Slip | |
| 180 PSI Compaction | | | | | | | | | |
| A | | 100 | | 100 | | 100 | | 100 | |
| B | 104. | 105 | 104. | 105 | 100. | 103 | 98. | 103 | 99. | 100 |
| C | 111. | 111 | 111. | 111 | 112. | 112 | 109. | 109 | 106. | 108 |
| Dry Ice | | | | | | | | | |
| A | | 100 | | 100 | | 100 | | 100 | | 100 |
| B | 114. | 112 | 114. | 112 | 114. | 112 | 114. | 112 | 119. | 114 |
| C | 103. | 104 | 103. | 104 | 103. | 104 | 105. | 106 | 105. | 106 |
| Wet Ice | | | | | | | | | |
| A | | 100 | | 100 | | 100 | | 100 | | 100 |
| B | 113. | 105. | 110 | 113. | 105. | 110 | 112. | 105. | 110 | 109. | 105. | 110 | 105. | 105. | 111 |
| C | 116. | 110. | 115 | 116. | 110. | 115 | 117. | 110. | 115 | 120. | 110. | 115 | 121. | 111. | 121 |

*A - Control tire - molded of control stock (Table 5, Column 2)
B - Tire with tread stock containing glass bundles and discrete filaments
C - Belted tire with tread stock containing glass bundles and discrete filaments b. The same tires as in (a) were evaluated as to braking capability on dry ice. The test vehicle speed was 10 MPH and only the rear wheel brakes were used. Sufficient runs were made to provide a statistically valid average distance. The braking rating was determined by the formula:

Braking Rating = (Distance to Stop Control Tire/Distance to Stop Experimental Tire) × 100

The results are given in Table 8 below.

TABLE 8

| Code* | Dry Ice Braking Average Distance, Feet | | | | | | Rating |
|---|---|---|---|---|---|---|---|
| A | 60.6. | 61.2. | 60.8. | 61.5. | 62.5. | 63.0 | 100 |
| B | | | 59.6. | 60.0 | | | 102, 103 |
| C | | | 56.9. | 58.6 | | | 107, 107 |

*See Table 7 c. The same tires as in (a) were evaluated on test vehicles to determine their braking capabilities in terms of average deceleration rate (ft/sec$^2$). The formula used in the determination is:

Deceleration Rate (Ft/Sec$^2$) = [Speed Reduction (Ft/Sec)/Time]

The results are shown in Table 9 below.

TABLE 9

| Code* | Average Deceleration Rate Average Distance, Feet | | | | | | Rating |
|---|---|---|---|---|---|---|---|
| A | 1.93, | 1.81, | 1.79, | 1.71, | 1.77, | 1.71 | 100 |
| B | | | 1.86, | 1.79 | | | 98, 103 |
| C | | | 1.91, | 1.81 | | | 106, 103 |

*See Table 7 d. The same tires evaluated on test vehicles to determine lateral traction capability on wet ice. Two dynamometer units were employed; one positioned at 90° from the test vehicle and hooked to the rear axle end and the other dynamometer unit being attached behind the test vehicle. The maximum directional force at zero lateral resistance was measured by the test vehicle imposing a force against the second dynamometer unit until excessive directional slip was produced. The maximum lateral resistance at zero directional force was measured by the first dynamometer unit imposing a force until excessive lateral slip was produced. Having determined maximum directional force and maximum lateral resistance, the directional force was increased incrementally and the resultant lateral resistance measured.

The results are given in Table 10 below.

TABLE 10

| Code* | Wet Ice Dynamic Lateral Traction Rating | | |
|---|---|---|---|
| | at 70 Lbs. Direct. Force | at 140 Lbs. Direct. Force | at 210 Lbs. Direct. Force |
| A | 100 | 100 | 100 |
| B | 129 | 140 | 172 |
| C | 137 | 160 | 249 |

*See Table 7

As can seen from the foregoing, the tires featuring treads containing glass, both in the form of filaments and in the form of chopped bundles, demonstrated considerably improved tractive performance under snow and ice conditions. The tires employing additionally the reinforcing belt between the carcass plies and the tread demonstrated the highest ratings. By way of summary, in the 180 PSI compaction, the glass belted tire containing glass in the tread showed about 9-12 percent improved traction. Under "wet ice" conditions, the improvement was about 15 percent. Lateral traction rating of the test tires demonstrated improvement, up to 72 percent for tires with the glass containing tread, and up to 150 percent for the tires with glass containing tread and employing the belt plies.

EXAMPLE IV

A neoprene stock was prepared in accordance with the formulation of Table 1. A proportion this compound was mixed on a mill. To it was added 30 parts of glass in the form of ¼ inch chopped bundles of glass filaments held together by an impregnant. 28.5 parts of the total chopped bundles were added first, which defilamentized into discrete individual filaments. The remainder of the bundles was added and mixed only enough to distribute the bundles through the stock. The tensile strengths of neoprene control stock and the glass filled stock were determined employing die out dumbbell specimens measuring 1 × ¼ × 0.075 inch. Tensile tests were also run on the glass containing stock having a single cord of a given material disposed interiorly and centrally of the sample during vulcanization. Similar tensile specimens were prepared with three parallel cords centrally and interiorly disposed. The test cords included a rayon cord, a nylon cord and a glass cord; the latter being composed of five 408-filament strands. The individual filaments were sized with aminopropyltriethoxy silane size and the ultimate cord was impregnated with LOTOL 5440. The results are given in Table 11 below.

TABLE 11

| | Rayon | Nylon | Glass Cord* |
|---|---|---|---|
| Neoprene Control (Table 1) | 88 lbs. | 60 lbs. | 72 lbs. |
| Glass Filled Stock + 1 cord | 217 lbs. | 184 lbs. | 170 lbs. |
| Glass Filled Stock + 3 parallel cords embedded in the specimen | 323 lbs. | 297 lbs. | 210 lbs. |

*5 strands of 408 filaments plied together with essentially no twist.

The glass filled stock (tested alone — no cords) demonstrated a tensile strength of 142 pounds. Referring to the strength values achieved with the specimen containing the three parallel cords in addition to the glass filaments and bundles contained in the matrix demonstrates an increase in strength over that expected; such increase believed due to a more effective transfer of stresses from one cord to the other due to the presence of the filaments and bundles.

Exactly why an elastomeric compound containing both chopped bundles and chopped individual filaments demonstrates improved physical properties and, as well, improved dynamic performance, that is, when incorporated into a vehicle tire, is not known. It is suspected that the individual filaments and the somewhat bulkier cords together cooperate to provide for a transfer of stress from one component to the other.

Another advantage of the glass filled elastomer containing both the individual fibers and the chopped bundles resides in the fact that the rubber appears to have more resilience, verve or bounce than a conventional stock filled solely with carbon black type reinforcement. It is suspected that this may be due to the fact that the carbon black surface absorbs the plasticizing components within the elastomer, whether they be short chain length "mers" or compounding plasticizing ingredients added in the preparation of the stock. In any event, utilizing a modified Izod Impact Tester employing a steel backup plate and a pendulum arrangement, it was determined that when a control rubber was located next to the backup plate, a pendulum swing yielded a rebound value of 12⅞ inches. A similar or identical elastomeric compound containing 15 parts per hundred of glass with a minor proportion of it in the form of discrete filaments and the major proportion in the form of chopped bundles revealed a rebound figure of 16 inches.

In accordance with a further aspect of the present invention, a conventional carcass ply reinforced tire is modified by utilizing, proximate the ply turnup edge, an enveloping strip of a compatible elastomeric stock containing both chopped bundles and short discrete filaments of glass distributed therethrough. The edge of the turnup position of the ply which terminates above the bead and partially into the side wall region is particularly subject to trouble as the tire repeatedly flexes; the edge being normally embedded in the same elastomeric matrix as the tire proper is relatively free to move, generating thereby heat and the propensity to ultimate weakness. By sandwiching the terminal edge of the ply turnup, in the near side wall region, with the stock referred to, the edge is effectively immobilized, avoiding the problem referred to.

Generally, it has been found that as little as about 2 parts per hundred of the rubber is sufficient to provide an improvement in properties, particularly tensile and tear strengths, as compared to the same composition containing no glass or filler. Inclusion of the glass in an amount exceeding about 35 parts of glass per hundred of elastomer reveals little or no increase in properties and, additionally, tends to lend such stiffness and toughness to the compound as to make it ill suited as a component for a pneumatic tire. Having in mind practical utility as a composition for use in manufacturing pneumatic tires, a glass level ranging from about 5 to 7 to about 17 to 25 percent represents a more useful range.

The amount of chopped bundles should exceed the amount of individual discrete filaments generally by a factor of from 4 to 1 to 5 to 1. The chopped bundles being formed of a multiple assembly of strands, each of which will number several hundred filaments, the bundles will usually be found to constitute from about 500 up to about 30,000 individual filaments. They, of course, are held in gathered-together bundle configuration by an elastomeric impregnant. The chopped bundles should fall within a range of from about ⅛ to 3 inches in length in order to afford reinforcement of the order of magnitude illustrated by the examples. Generally, in a mill mixture of the glass reinforced material the bundles will fall within the range of from about ⅛ to about 1 inch. Generally, we have found that the greatest utility at cross-section of use favors a bundle length of from about ⅛ to about ½ inch.

Generally, the individual discrete filaments of glass constituting the minor proportion of the total glass are achieved by an incorporation of the bundles in chopped form into the glass into the rubber while in the Banbury or on the mill. The mixing cycle reduces the bundles to individual filaments and at the same time reduces the length. Thus, we have found that the filaments will range from 1/64 to ¼ inch in length. Any increase in the length of the individual filaments fails to improve the properties of the material.

Tires composed of the glass filled elastomeric stock material (containing both discrete filaments and short chopped bundles) are capable of manufacture without the conventional bias cord carcass ply or plies. This avoids the necessity of calendering the carcass fabric composed of mutually parallel cords and the care of arranging for opposite inclinations of the cords for tire balance. Bias cutting of fabric can also be avoided.

In producing a tire formed only of glass filled elastomeric stock, the latter stock containing both chopped bundles and filaments is formed into appropriate sheet stock, strip stock and camelback stock. Next, these components of predetermined complementary configuration are assembled to turn in appropriate disposition on a conventional tire building drum. Conventional bead ring members are lastly assembled onto the "green" tire and the tire expanded into ultimate tire configuration and simultaneously vulcanized to yield a fully cured tire which is fully devoid of any conventional textile carcass plies.

It is frequently desirable to adjust the level of the glass to correspond to the position of the particular sheet or strip on the tire building drum. Thus, a relatively high glass content is employed in those components laid down first on the drum while the succeeding components are composed of stock containing less glass and less glass. Finally, the last-applied components are composed of about 3–6 percent glass, e.g., the tread. In this manner, the expansion of tire in the mold can proceed with a minimum of flow difficulties.

To obtain a tire featuring a relatively high glass level of reinforcement throughout, it is frequently most desirable to adopt the technique employed in building "radial" type tires; that is, those having cords extending directly from bead to bead and consequently incapable of expansion in the Bag-O-Matic cure. Thus, the tire is built in a green or uncured configuration closely approximating the final vulcanized configuration. Under these circumstances, it is, of course, possible to in effect "tailor make" the tire by employing elastomeric stock containing both chopped bundles and discrete filaments and in which these components are located with a pattern of orientation as achieved on the mill. Thus, by observing the mixing operation, it is possible to achieve a degree of orientation which is parallel with the movement of the stock on the mill. Naturally, sheet stock so composed, when removed from the mill, can be cut into dimensional sheets and strips and built into plied sheets and strips of variant orientation for particular location in the ultimate tire as best meets the particular stress conditions expected statistically in that region of the tire.

It is an important feature of the present invention that the bundles and the discrete individual filaments are firmly secured to the surrounding elastomeric matrix. Examination of the test tires of Example III revealed, even after considerable wear, the presence of fibers and cords present as discontinuities in the tread surface. These are readily observable to the eye or to the touch; that is, by rubbing the palm or the fingers across the surface of the tread.

It is a further feature of the present invention that the presence of glass in its tightly anchored condition in the tread region, as accomplished through the employment of the size and impregnant compositions as described earlier, results in improved physical properties such as, for example, resistance to abrasion and resistance to chunking and cut through. Resistance to chunking and cut through have been particularly observed in treads fabricated for and tested on "off the road" equipment and/or vehicles. It is believed that the foregoing improvements are the result of the sytem created by the presence of the anchored glass tending to preclude or reduce creation of tension in the tread under service conditions.

Modifications may be resorted to without departing from the spirit and scope of the invention as defined in the appended claims.

We claim:

1. A vulcanizable structure comprising:
an elastomeric matrix and
a plurality of elongate, mutually parallel cords of an organic material disposed within said matrix, said elastomeric matrix also including, in proximate and surrounding relationship with said parallel cords, a plurality of discrete individual filaments of glass ranging up to about ¼ inch in length and a plurality of chopped glass cords ranging from about ⅛ inch to about 3 inches in length, said glass cords comprising essentially a plurality of glass filaments held in juxtaposition by an elastomeric impregnant.

* * * * *